Patented Dec. 19, 1950

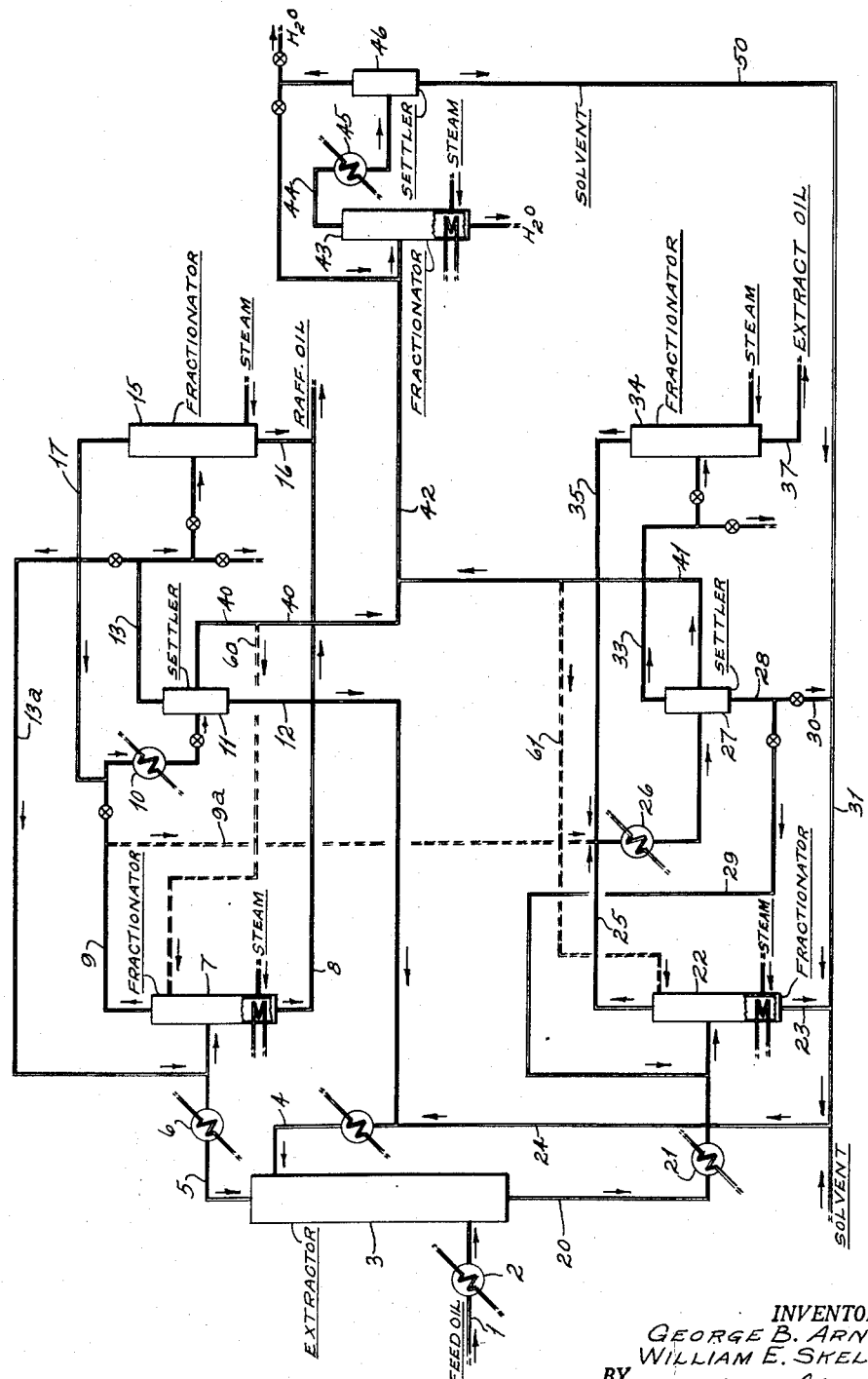

2,534,382

UNITED STATES PATENT OFFICE 2,534,382

METHOD OF REFINING OIL WITH A SOLVENT

William E. Skelton, Beacon, and George B. Arnold, Glenham, N. Y., assignors to The Texas Company, New York, N. Y., a corporation of Delaware Application September 30, 1947, Serial No. 777,071

8 Claims. (Cl. 196—14.26)

This invention relates to a method of refining oil with a solvent liquid which is at least partially miscible with water at ordinary temperatures and particularly relates to the extraction of oil containing constituents whose true boiling point is lower than or in the same boiling range as that of the solvent.

In accordance with the invention, a relatively low boiling feed oil, such as kerosene, is extracted with a selective solvent, such as furfural, in the presence of a small amount of water and under conditions effective to form extract and raffinate phases respectively. The raffinate phase comprises non-aromatic or relatively insoluble constituents of the oil mixed with a small proportion of the solvent and water. The extract phase comprises the relatively aromatic and naphthenic constituents of the oil dissolved in the main body of aqueous solvent.

The extract and raffinate phases are separately subjected to azeotropic fractional distillation so as to effect separation of solvent from the oil. The invention contemplates supplying sufficient steam or water to the fractionating zone in which the raffinate phase is distilled to form a ternary water-oil-solvent azeotrope with all or substantially all of the solvent present in the raffinate phase mixture. In the distillation of the extract phase mixture, sufficient steam or water is added to the fractionating zone to form a ternary solvent-water-oil azeotrope either with all or with a major portion of the extract oil present in the extract phase mixture.

The resulting distillates are separately cooled, condensed and subjected to settling, so that they separate into oil-rich, water-rich and solvent-rich liquid layers respectively. The oil-rich liquid from each settling zone is separately subjected to azeotropic distillation in the presence of steam or water so as to form in each case a ternary solvent-oil-water azeotrope with all of the residual solvent present in the oil-rich liquids. The resulting ternary azeotrope distillates are advantageously recycled to the previously mentioned settling zones. In other words, that derived from the raffinate phase mixture is recycled to the settling zone, operating in conjunction with the raffinate phase fractionator while that derived from the extract phase is recycled to the settler which operates in conjunction with the extract phase fractionator.

If desired, the oil-rich phase obtained from the raffinate can be recycled, all or in part, through pipe 13A to the tower 7.

According to a modification of the invention, the distillate discharged from the raffinate phase fractionating zone, instead of being separately cooled and condensed, can be commingled with the distillate from the extract phase fractionating zone, and the resulting mixture treated as already described.

The oil-rich layers previously referred to are drawn off and passed to a fractionator wherein residual solvent is stripped from the water, and the so-recovered solvent recycled to the extraction zone. If desired, a portion of the water-rich liquid removed from each settling zone may be recycled as reflux to the raffinate phase and extract phase fractionating zones respectively to supply at least in part the water required for azeotropic distillation.

The solvent-rich layers previously referred to are drawn off and recycled to the extraction zone. According to one modification, the furfural-rich liquid drawn off from the settling zone operating in conjunction with the extract phase fractionator is recycled to the extract phase fractionator.

The invention thus involves recovering solvent as a distillate from the raffinate oil and as an oil-free or substantially oil-free liquid residue from the extract phase.

The invention is particularly applicable to the solvent treatment of low boiling oils, such as kerosene or fractions of petroleum boiling in the range of about 300 to 650° F. (ASTM), and comprising constituents which form relatively low boiling azeotropes with the solvent and water. A feature of the invention is that only a small portion of the solvent is vaporized in recovering the solvent from the raffinate and extract oils, so that considerable saving in heat is realized over a process involving recovery of the solvent by simple distillation. In addition, the solvent is subjected to less severe temperatures and, therefore, subject to less decomposition.

In order to illustrate the invention in more detail, reference will now be made to the accompanying drawing comprising a flow diagram of the process as applied to the treatment of kerosene derived from California crude. The feed oil has an API gravity of about 40.4 and has an ASTM boiling range as follows:

|     | °F. |
|-----|-----|
| IBP | 332 |
| 10% | 365 |
| 20% | 377 |
| 50% | 414 |
| 90% | 482 |
| E. P. | 520 |

As indicated in the drawing, the feed oil is conducted from a source not shown through a pipe 1 and heat exchanger 2 to the lower portion of an extraction tower 3 of conventional type.

The feed oil rises through the packing of the tower countercurrently to a stream of solvent liquid introduced to the upper portion of the tower through a pipe 4. The solvent comprises furfural and may contain water and oil as a result of previous use in the process. It thus contains about 15.0% oil and 3.0% water. It is introduced to the tower in the proportion of about 1 volume of solvent to 2 volumes of oil. The temperatures of entering streams of oil and solvent are regulated, so that the temperature at the bottom of the tower is maintained at about 100° F., while the temperature at the top is maintained at about 150° F.

Under these conditions, extract and raffinate phases form. The raffinate phase comprises oil amounting to from about 60 to 80% by volume of the feed oil. The raffinate phase is continuously removed from the upper portion of the tower 3 through a pipe 5 and heat exchanger 6 to a fractionator 7. Heat may be supplied to the bottom of the fractionator either with open steam, a closed heating coil, or a combination of both. As will be mentioned later, provision is made for supplying reflux liquid to the top of the tower. Sufficient water is introduced to the tower either in the form of steam or water reflux or both steam and reflux liquid to form the ternary water-oil-furfural azeotrope with all of the furfural present in the raffinate phase feed. The top of the tower is maintained at a temperature of about 205° to 250° F., and the bottom at a temperature of about 250° to 500° F., so that the solvent is completely or substantially completely distilled from the raffinate oil, the solvent-free oil being discharged through pipe 8. Actual tower temperatures will depend upon the true boiling point curve of the oil.

The distillate comprising solvent, water, and a small amount of oil is moved through pipe 9 into condenser 10 to a settling chamber 11. The settler is maintained at a temperature of about 70 to 150° F., and the condensate separates into oil-rich, water-rich, and solvent-rich liquid layers respectively. The composition of the three layers is approximately as follows:

|  | Furfural | Oil | Water |
| --- | --- | --- | --- |
|  | Per Cent | Per Cent | Per Cent |
| Oil-rich layer | 4–6 | 94–96 | 0.1–0.2 |
| Water-rich layer | 6–7 | 0.1 | 94–93 |
| Furfural-rich layer | 80–82 | 15 | 3 |

The solvent-rich liquid is continuously drawn off through pipe 12 which communicates with pipe 4 by which this liquid is recycled to the extraction tower 3.

The oil-rich liquid is drawn off from the top of the settling chamber through a pipe 13 and passed to a secondary fractionator 15 wherein it is subjected to azeotropic distillation, sufficient water being injected into the fractionator either in the form of open steam or water reflux to form the ternary azeotrope of furfural, oil, and water, the operation of this fractionator being conducted so as to effect recovery of raffinate oil from the oil-rich liquid. The recovered oil is discharged through pipe 16, while the distillate from this fractionator is recycled through a pipe 17 to the settling chamber 11.

The recovered oil has approximately the following characteristics:

| | |
| --- | --- |
| Gravity A. P. I | 42.0 |
| Aniline point | 136.5 |
| Sulfur, per cent | 0.01 |
| Refractive index | 1.445 |

The extract phase collecting in the bottom of the extraction tower 3 is continuously drawn off through pipe 20 and exchanger 21 to an extract phase fractionator 22. This fractionator, like fractionator 7, is provided with means for supplying heat to the bottom thereof, either in the form of open steam or a closed heating coil or both, provision being made also for the introduction of reflux liquid. Sufficient water is injected through the fractionator to form a ternary furfural-oil azeotrope with all or a desired portion of the extract oil. The extract oil is thus removed in the form of a distillate while oil-free solvent or solvent containing a predetermined quantity of extract oil is discharged as a residual liquid through pipe 23 for recycle through pipe 24 to the extraction tower.

The distillate is drawn off through pipe 25 and condenser 26 to a settler 27 maintained at about 70 to 150° F., so that separation into oil-rich, water-rich, and solvent-rich liquid layers occurs.

The solvent-rich liquid is drawn off through pipe 28, and, according to a preferred mode of operation, is recycled through pipe 29 to the fractionator 22. All or a portion of it may be so recycled. On the other hand, all or a portion of this solvent-rich liquid may be conducted through pipes 30 and 31 for return through pipes 24 and 4 to the extractor.

The oil-rich liquid accumulating in the top of the settling chamber 27 is drawn off through pipe 33 to another secondary fractionator 34 operated in a manner somewhat similar to the fractionator 15, so that all of the solvent is azeotropically distilled from the extract oil. The resulting distillate is recycled through pipe 35 to the settler 27, while the extract oil product is discharged from the bottom of the fractionator through pipe 37. This extract oil is of the following approximate character:

| | |
| --- | --- |
| Gravity A. P. I | 32.7 |
| Refractive index | 1.4895 |
| Sulfur, per cent | 0.5 |

The water-rich liquid layers accumulating in the mid-portions of settlers 11 and 27 are drawn off through pipes 40 and 41 respectively and conducted through pipe 42 to a tertiary fractionator 43. This water-rich liquid comprises about 94% water, the remainder being chiefly furfural with 0.1 to 2% oil. The solvent is distilled from the bulk of the water in the fractionator 43, and the resulting distillate conducted through pipe 44 and condenser 45 to a settler 46 wherein separation into water layers and solvent layers respectively occurs. All or a portion of the water layers may be recycled while the solvent layer is drawn off through pipe 50 communicating with pipe 31 by which it is returned to the extractor 3.

As indicated in the drawing, a portion of the water-rich liquid flowing through pipe 40 may be diverted through a pipe 60 as reflux liquid to the fractionator 7, while a portion of the water-rich liquid from pipe 41 may be diverted through a pipe 61 as reflux to the fractionator 22.

If desired, and especially when handling gas oils, the distillate from the fractionator 7 may be diverted from pipe 9 through a branch pipe 9A and thus passed to the condenser 26 wherein it merges with the distillate from fractionator 22. In this way, and with a small sacrifice in raffinate oil yield, the settler 11 and fractionator 15 can be omitted.

Also, instead of employing the fractionators 15 and 34, the oil-rich liquids flowing through pipes 13 and 33 may be washed either separately or in the presence of each other with a liquid medium and under conditions effective to extract the residual solvent from the oil. The extracted residual solvent can be recovered for reuse. For example, these oil-rich liquids can be subjected to contact with water at an elevated temperature of about 200 to 300° F., so that furfural is selectively dissolved from the oil by the water. The resulting water solution can then be subjected to countercurrent contact with a stream of feed oil at a temperature of about 100 to 130° F., so as to extract the dissolved furfural from the water and the resulting solution of furfural in feed oil is then passed to the extractor 3.

If desired, provision may be made for recycling at least a portion of the oil-rich liquid from the settler 11 to the fractionator 7. As previously indicated, the fractionator 22 may be operated to effect partial stripping of extract oil from the furfural. Thus, it may be operated so that the furfural stream removed through pipe 23 retains 0 to 10% by volume of extract oil, depending upon the amount of such extract oil which it is desired to recycle to the extraction tower 3. In the treatment of light feed oils, the solubility in the solvent may be so great as to require operation at relatively low temperatures in order to obtain a satisfactory raffinate oil yield.

While the treatment of kerosene has been specifically referred to in connection with the drawing, nevertheless, it should be understood that the process is applicable to the treatment of virgin and cracked gas oils and also to the treatment of kerosene containing, usually in small amounts, constituents having a true boiling point lower than, or in the same boiling range as that of the solvent used. In general, it has application to the treatment of hydrocarbon mixtures having an A. S. T. M. boiling range of about 325 to 625° F. It is also contemplated that it has application to the treatment of oils derived from animal and vegetable sources. Specific conditions of temperature and solvent dosage may vary from those specifically mentioned, depending on the character of the feed oil undergoing treatment and the degree of fractional separation desired in the extraction tower 3.

The invention is particularly concerned with the use of relatively high boiling organic solvent liquids which are miscible, at least to some extent with water, and with which constituents of the oil feed in the presence of water form azeotropes. Selective solvents other than furfural may be used. They may include other derivatives of the furan group and other aldehydes such as benzaldehyde, nitrobenzene and ketones, etc.

Obviously, many modifications and variations of the invention as above set forth may be made without departing from the spirit and scope thereof, and therefore only such limitations should be imposed as are indicated in the appended claims.

We claim:

1. In the solvent refining of feed oil of the class consisting of kerosine and low boiling gas oil and containing at least a small proportion of constituents having true boiling points in the range of the solvent boiling temperature and below wherein the feed oil is subjected to contact in an extraction zone in the presence of water with a water-miscible organic solvent liquid comprising furfural having selective action as between the paraffinic and non-paraffinic constituents, extract and raffinate phases are formed respectively lean in and rich in said paraffinic constituents, said phases separately removed from the extraction zone, each of said removed phases comprising oil, solvent and water, and the removed phases separately treated to recover solvent from the oil for reuse in the extraction zone, the method comprising distilling from said raffinate phase in the presence of steam a ternary azeotrope distillate containing substantially all of the solvent in the removed raffinate phase and leaving a substantially solvent-free raffinate oil, discharging raffinate oil, separately distilling from said extract phase in the presence of steam a ternary azeotrope distillate containing at least the bulk of the extract oil in the removed extract phase and leaving the bulk of the solvent content of the removed extract phase as a residual liquid fraction, recycling resulting residual fraction to the extraction zone, separately subjecting each of said distillates to substantially complete condensation, separately subjecting the resulting condensates to settling at a temperature of about 70° to 150° in separate settling zones under conditions such that there is no substantial vaporization of water, forming in each settling zone, oil-rich, water-rich and solvent-rich liquid layers respectively, separately withdrawing liquid from each layer, recycling withdrawn solvent-rich liquids from both settling zones to said extraction zone, separately distilling residual solvent from each of said withdrawn oil-rich liquids, combining said withdrawn water-rich liquids, subjecting resulting combined liquid to a further distillation to remove excess water from residual solvent, discharging resulting aqueous distillate, and recycling resulting residual solvent recovered from the oil-rich liquids and also from the combined liquids to the extraction zone.

2. The method according to claim 1 in which said withdrawn oil-rich liquids are separately subjected to azeotropic distillation in the presence of steam under conditions effective to obtain ternary solvent-oil-water azeotropes as distillates, leaving substantially solvent-free oil as liquid residues, the resulting residues are discharged and said ternary azeotrope distillates are condensed and recycled to the settling zones respectively which supply the fractionating zones from which they are derived.

3. In the solvent refining of kerosene and low boiling gas oils containing at least a small proportion of constituents having true boiling points in the range of the solvent boiling temperature and below wherein the feed oil is subjected to contact in an extraction zone with a water miscible organic solvent liquid having selective action as between paraffinic and non-paraffinic constituents of the feed, extract and raffinate phase mixtures are formed respectively lean in and rich in said paraffinic constituents, said phase mixtures are separately removed from the extraction zone, and the removed phase mixtures separately treated to recover solvent from the oil for re-use in the extraction zone, the method comprising subjecting said raffinate phase mixture in a primary distilling column to distillation in the presence of water vapor under conditions such that substantially all of the solvent is removed as a solvent-water-oil azeotrope distillate, leaving a primary distillation residue consisting of raffinate oil substantially free from solvent, separately subjecting said extract phase mixture in a primary distillation column to distillation in the presence of water vapor under conditions such that substantially all of the extract oil is removed as a oil-water-solvent azeotrope distillate, leaving another primary distillation residue consisting of solvent substantially free from oil, separately condensing said primary azeotrope distillates, separately subjecting resulting condensates to settling in settling zones maintained under conditions such that there is no substantial vaporization of water, forming in each settling zone oil-rich, water-rich and solvent-rich liquid layers respectively, separately withdrawing liquid from each layer, recycling withdrawn solvent-rich liquids at least in part to said extraction zone, separately distilling residual solvent from said withdrawn oil-rich liquids to recover solvent, recycling resulting recovered solvent to the extraction zone, subjecting said withdrawn water-rich liquids to further distillation to strip water therefrom, leaving a residual concentrate of solvent, and recycling said solvent concentrate to the extraction zone.

4. The process according to claim 3 in which the solvent comprises furfural.

5. In the solvent refining of kerosene and low boiling gas oils containing at least a small proportion of constituents having true boiling points in the range of the solvent boiling temperature and below wherein the feed oil is subjected to contact in an extraction zone with a water miscible organic solvent liquid having selective action as between paraffinic and non-paraffinic constituents of the feed, extract and raffinate phase mixtures are formed respectively lean in and rich in said paraffinic constituents, said phase mixtures are separately removed from the extraction zone, and the removed phase mixtures separately treated to recover solvent from the oil for re-use in the extraction zone, the method comprising subjecting said extract phase in a primary distillation column to distillation in the presence of water vapor under conditions such that substantially all of the extract oil is removed as an oil-water-solvent azeotrope distillate, leaving a primary distillation residue consisting substantially of solvent substantially free of solvent, condensing resulting primary azeotrope distillate, subjecting resulting condensate to settling in a settling zone maintained under conditions such that there is no substantial vaporization of water, forming in said settling zone oil-rich, water-rich and solvent-rich liquid layers respectively, separately withdrawing liquid from each layer, recycling withdrawn solvent-rich liquid at least in part to said extraction zone, separately distilling residual solvent from said withdrawn oil-rich liquid to recover solvent, recycling recovered solvent to the extraction zone, subjecting said withdrawn water-rich liquid to further distillation to strip water therefrom leaving a residual concentrate of solvent and recycling said concentrate to said extraction zone.

6. The method according to claim 5 in which the solvent comprises furfural.

7. In the solvent refining of kerosene and low boiling gas oils containing at least a small proportion of constituents having true boiling points in the range of the solvent boiling temperature and below wherein the feed oil is subjected to contact in an extraction zone with a water miscible organic solvent liquid having selective action as between paraffinic and non paraffinic constituents of the feed, extract and raffinate phase mixtures are formed respectively lean in and rich in said paraffinic constituents, said phase mixtures are separately removed from the extraction zone, and the removed phase mixtures separately treated to recover solvent from the oil for re-use in the extraction zone, the method comprising subjecting said extract phase in a primary distillation column to distillation in the presence of water vapor under conditions such that substantially all of the extract oil is removed as an oil-water-solvent azeotrope distillate, leaving a primary distillation residue consisting substantially of solvent substantially free from oil, condensing resulting primary azeotrope distillate, subjecting resulting condensate to settling in a settling zone maintained under conditions such that there is no substantial vaporization of water, forming in said settling zone a plurality of liquid layers comprising an oil-rich liquid layer containing small amounts of solvent and water, and a water-rich liquid layer containing small amounts of oil and solvent, separately withdrawing liquid from each layer, distilling residual solvent from said withdrawn oil-rich liquid leaving a residue of extract oil substantially free from solvent, recycling so recovered solvent to the extraction zone, discharging said residue of oil, subjecting said withdrawn water-rich liquid to further distillation to strip water therefrom, leaving a residual concentrate of solvent, and recycling said concentrate to said extraction zone.

8. The method according to claim 7 in which the solvent comprises furfural.

WILLIAM E. SKELTON.
GEORGE B. ARNOLD.

REFERENCES CITED

The following references are of record in the file of this patent:

UNITED STATES PATENTS

| Number | Name | Date |
|---|---|---|
| 2,139,240 | McFarland | Dec. 6, 1938 |
| 2,154,189 | Weir | Apr. 11, 1939 |
| 2,154,372 | Bosing | Apr. 11, 1939 |
| 2,168,570 | Kraft | Aug. 8, 1939 |
| 2,216,933 | Atkins | Oct. 8, 1940 |
| 2,290,636 | Deanesly | July 21, 1942 |
| 2,381,996 | Bloomer | Aug. 15, 1945 |
| 2,419,039 | Scarth | Apr. 15, 1947 |
| 2,465,959 | Tindall | Mar. 29, 1949 |